UNITED STATES PATENT OFFICE.

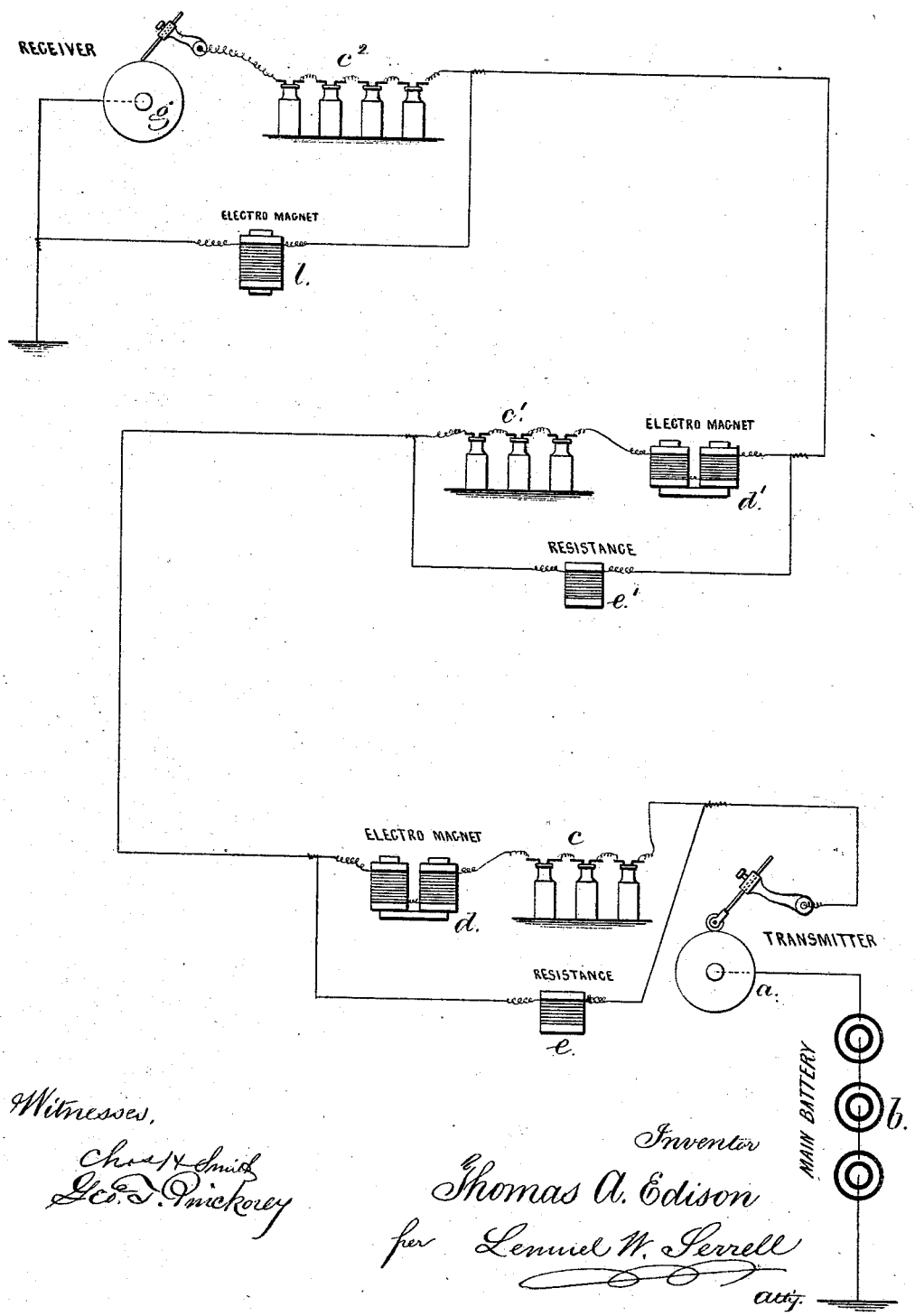

THOMAS A. EDISON, OF NEWARK, NEW JERSEY, ASSIGNOR TO HIMSELF AND GEORGE HARRINGTON, OF WASHINGTON, D. C.

IMPROVEMENT IN AUTOMATIC TELEGRAPHS.

Specification forming part of Letters Patent No. 168,243, dated September 28, 1875; application filed January 26, 1875.

CASE 103.

*To all whom it may concern:*

Be it known that I, THOMAS A. EDISON, of Newark, in the county of Essex and State of New Jersey, have invented an Improvement in Automatic Telegraphs, of which the following is a specification:

The object of this invention is to obtain more powerful action at the chemical receiving-instruments, and to obtain a more powerful compensation for the static currents of the line, and also to neutralize the reactionary or secondary currents from electro-magnets introduced in the line.

It is well known that when a secondary battery, made of cells containing acidulated water and two metals of the same character, is introduced into a main circuit, the secondary battery sets up a current in the same direction as a current passing through that secondary battery from the main battery, thus intensifying the pulsations on the line; and that when the circuit to the main battery is broken, the secondary battery sets up a current in the opposite direction. The action of an electro-magnet is the reverse, as such electro-magnet sets up a current opposed to the main current when the circuit is closed, and in the same direction when the circuit is interrupted or broken.

I make use of an electro-magnet contiguous to the chemical receiving-instrument, for compensating or neutralizing the static discharge of the line, as set forth in my Patent No. 135,531, and I employ the secondary battery aforesaid in addition, to insure more distinct pulsations at the receiving-instrument. With signaling electro-magnets or sounders placed in the main line, I use the said secondary batteries to neutralize the effects of such electro-magnets in the line when they discharge.

In the diagram, the transmitter $a$ is shown for perforated paper; but it may be of any desired character. The main battery $b$ is connected with the earth and transmitter. The secondary battery $c$, of acidulated water in cells, also containing similar metallic poles, is placed in the main line. $d$ is an electro-magnet, which may be of a relay or sounder, and $e$ is a resistance, which should be an adjustable rheostat in a shunt around the receiving-instrument and secondary battery. These parts are duplicated at $c^1$, $d'$, and $e'$, and it is to be understood that they may be used at any number of intermediate stations. In each instance the secondary battery augments the power of the pulsation sent from the main battery sufficiently to make up for the resistance of the magnets or line.

The rheostat $e$ or $e'$ causes the proper proportion of current to pass through $c$ $d$, and as the electro-magnet discharges, upon breaking the main circuit, a path is provided for the same in the local circuit, so that it will not pass out upon the line and interfere with or mutilate the signals, and the discharge of the secondary battery neutralizes the static charge of the line and the discharge of the electro-magnet by opposing the same.

By this arrangement intermediate relays and sounders can be introduced without interfering with the rapid pulsations on the main line.

At the chemical receiving-instrument $g$ the secondary battery $c^2$ is used to intensify the pulsation on the main line, and produce a distinct mark, and also, by its discharge, to neutralize the static discharge from the line; and the electro-magnet $l$ is introduced in a branch around the receiving-instrument to set up a secondary or reactionary current, to aid in neutralizing the static discharge from the line, as in aforesaid patent.

This magnet also serves as a resistance to direct a portion of the current through the chemical paper.

I claim as my invention—

1. The secondary battery, with poles of similar materials, applied in the main circuit, containing the receiving-instrument, in combination with a shunt around the receiving-instrument, containing a resistance or electro-magnet, for the purposes set forth.

2. The combination, with the signaling electro-magnet, placed in the line, of a secondary battery, also in the line, and a shunt around such instrument, containing a resistance, substantially as set forth.

Signed by me this 18th day of January, A. D. 1875.

THOS. A. EDISON.

Witnesses:
 GEO. T. PINCKNEY,
 CHAS. H. SMITH.